(12) United States Patent
Aday et al.

(10) Patent No.: US 6,554,523 B2
(45) Date of Patent: Apr. 29, 2003

(54) HYDRAULIC ROD CONNECTOR SYSTEM

(75) Inventors: James C. Aday, Houston, TX (US); Randall F. Weaver, Houston, TX (US)

(73) Assignee: National-Oilwell L.P., Houston, TX (US)

(*) Notice: Subject to any disclaimer, the term of this patent is extended or adjusted under 35 U.S.C. 154(b) by 0 days.

(21) Appl. No.: 09/843,997

(22) Filed: Apr. 27, 2001

(65) Prior Publication Data
US 2002/0159823 A1 Oct. 31, 2002

(51) Int. Cl.[7] ............................................. F16B 11/00
(52) U.S. Cl. ........................... 403/31; 403/34; 403/35; 403/36; 403/37; 403/38; 403/315; 403/316; 285/80; 285/81
(58) Field of Search ..................... 403/31–32, 34–38, 403/365–368, 370, 372, 374.3, 315–316; 285/80–81, 89, 101, 106, 96, 353; 166/380

(56) References Cited

U.S. PATENT DOCUMENTS

| | | | |
|---|---|---|---|
| 2,318,590 A | * | 5/1943 | Boynton |
| 4,425,050 A | * | 1/1984 | Durand |
| 4,456,396 A | * | 6/1984 | Damratowski |
| 4,616,948 A | * | 10/1986 | Jelfs |
| 4,648,629 A | * | 3/1987 | Baugh |
| 5,672,026 A | * | 9/1997 | Disborg |
| 5,904,071 A | | 5/1999 | Kennedy et al. |
| 6,173,793 B1 | * | 1/2001 | Thompson et al. |
| 6,231,262 B1 | * | 5/2001 | Whitney |
| 6,264,212 B1 | * | 7/2001 | Timoney |

FOREIGN PATENT DOCUMENTS

| | | | |
|---|---|---|---|
| GB | 2190170 | 11/1987 | |
| GB | 2190170 A | * 11/1987 | ............. F16J/7/00 |
| GB | 2309501 | 7/1997 | |

OTHER PUBLICATIONS

The British Patent Office Search Report for Application No. GB 0209496.9 dated Sep. 13, 2002 (1 p.).

* cited by examiner

Primary Examiner—Lynne H. Browne
Assistant Examiner—Ryan Flandro
(74) Attorney, Agent, or Firm—Conley, Rose, P.C.

(57) ABSTRACT

A hydraulic connector assembly is provided to couple an extension rod to a piston rod in a reciprocating pump. The connector assembly utilizes a single hydraulic ram to provide the compressive connecting force between the two rods. The connector assembly includes a mechanism for mechanically locking the hydraulic ram in place so that loss of hydraulic power does not uncouple the assembly. The piston rod and the connector rod can be coupled and uncoupled without the use of heavy wrenches, hammers, or impact tools.

8 Claims, 2 Drawing Sheets

HYDRAULIC ROD CONNECTOR SYSTEM

BACKGROUND OF THE INVENTION

The present invention relates to high pressure, reciprocating pumps of the type typically used to circulate drilling fluid through a wellbore. More particularly, the present invention relates to a system and apparatus for coupling a piston rod to an extension rod that eliminates the need for heavy tools in the coupling and uncoupling of the rods. Still more particularly, the present invention relates to a system and apparatus that simplifies the maintenance of the pump while maintaining a reliable mechanical attachment between the piston rod and the extension rod.

In extracting hydrocarbons, such as oil and gas, from the earth it is common to drill a well into the earth formation containing the hydrocarbons. A drill bit is attached to a drill string, including joined sections of drill pipe, suspended from a drilling rig and extended into a wellbore. During drilling operations, drilling fluid, or mud, is pumped down through the drill pipe, into the hole through the drill bit, and back to the surface. Drilling mud is used to lubricate, cool, and clean the drill bit. The drilling mud also provides well control by counteracting formation pressure and returns cuttings from the drilling process to the surface.

Large reciprocating pumps, also known as positive displacement, slush, or mud pumps, are commonly used for pumping the drilling mud. Because of the need to pump the drilling mud through several thousand feet of drill pipe, such pumps typically operate at very high pressures. Moreover, a large volume of mud must be pumped so that the mud will emerge from the drill bit downhole at a relatively high velocity in order to lubricate and cool the bit and effectively remove cuttings from the hole. Lastly, the pressure generated by the mud pump contributes to maintaining a predetermined total downhole pressure, which is necessary to prevent well blowouts and optimize drilling performance.

Mud pumps are typically of a modular construction and comprise a power end and a fluid end. The power end provides the power for the pump from a power-producing device, such as a diesel engine or electric motor, and drives an output shaft or an extension rod. The fluid end of a mud pump comprises the equipment that actually interacts with the drilling mud, such as pistons and liners. Because drilling mud is highly abrasive, the fluid end is typically designed so that dynamic parts that are in contact with the mud can be replaced. These parts are often replaced as part of a regular maintenance schedule on set intervals, some components are replaced as often as every few weeks. The fluid end and the power end are connected between the output shaft and the piston, usually by an extension rod or other connecting component.

The pistons and cylinders used for such mud pumps are susceptible to a high degree of wear during use because the drilling mud is relatively dense and has a high proportion of suspended abrasive solids. As the cylinder becomes worm, the small annular space between the piston head and the cylinder wall increases substantially and sometimes irregularly. This decreases the efficiency of the pump. To reduce the effect of this wear, the cylinder typically is provided with a replaceable cylinder liner and piston. It is the usual practice to replace the cylinder liner and piston at end of their useful life, which is normally every 500 to 1500 operating hours, depending on pump design and operating conditions.

Although the pumps are not always operating, the typical drilling rig operates non-stop, therefore the replacement of worn pistons and cylinder liners needs to be performed on a regular basis. Furthermore, the replacement of these components needs to be accomplished quickly and easily. The first step in the maintenance of the mud pump is separating the fluid end from the power end by disconnecting the extension rod from the piston rod.

In U.S. Pat. No. 5,904,071, a hydraulically controlled piston rod assembly for use in high pressure reciprocating pumps is disclosed. The disclosed piston rod assembly comprises a connector releasably connected between a power end component and a fluid end component, with the connector having a body member and first and second tension links, wherein each link has a coupling pin to co-operate with respective apertures on the end components. The connector further includes biasing means for biasing the links, when coupled, in shear to resist uncoupling thereof and a means for causing movement of the one or more links against said bias to enable their movement into co-operative disposition with the end components to permit coupling or uncoupling. At least one of the links does not extend beyond the axial limit of the body. The assembly utilizes springs to bias the links and hold the pin in shear. The assembly uses a centrally located pressure area to push two pistons in opposite directions to counteract the biased springs so that the pins can be removed.

The above-disclosed assembly relies on springs to provide the biasing force to keep the pins from uncoupling. Over time, these springs will fatigue and provide less biasing force. The assembly also requires the use of specially designed end components adapted to accept the coupling pins.

Notwithstanding the above teachings, there remains a need for a system and apparatus for coupling and uncoupling the shafts in a high pressure reciprocating pump that overcomes the foregoing difficulties while providing more advantageous overall results.

SUMMARY OF THE INVENTION

The present invention features a system and apparatus for easy and reliable coupling and uncoupling of two cylindrical rods, such as the extension rod and piston rod of a mud pump. The apparatus utilizes a single hydraulically operated ram to provide a compressive force between the two rods. The apparatus also incorporates a mechanical lock to maintain the compressive force once pressure is removed from the ram. The mechanical lock provides a backup to the hydraulic ram and increases the reliability of the system. The apparatus allows the extension rod and the piston rod to be coupled and uncoupled without requiring wrenches, hammers, or impact tools. This creates a safer and more predictable process for coupling and uncoupling two rods, as well as decreasing the time required for the process.

The first rod is coupled to one end of a connector body by pins or some other connecting apparatus. The second rod fits inside of the body and face to face with the first rod. A hydraulic ram travels along the outside of the second rod and forms a differential pressure chamber by sealing against the inside of the body. The sidewall of the body has an opening that allows the application of pressure to the pressure chamber. The second rod has a groove that accepts a split ring that forms a circumferential shoulder on which the hydraulic ram bears. Application of pressure to the pressure chamber moves the ram against the split ring shoulder and imparts a compressive force between the ends of the two rods. The compressive force applied is adjustable but should be greater than the maximum tensile force that will be applied during operation of the pump. This results in a net compressive force for all operating conditions and significantly increases the fatigue life of the coupling mechanism.

After the desired amount of load is imparted to the cylindrical rods a threaded retainer screw is installed onto the body to hold the hydraulic ram in place once pressure is removed. The pressure application device can be removed during normal operation. To uncouple the rods, pressure is reapplied to the ram and the retainer screw is removed. Once the retainer screw is removed, one or both of the rods can be uncoupled, and maintenance of the pump can proceed.

The present invention provides an improved method and apparatus to couple and uncouple the extension rod and piston rod of a mud pump. Because no heavy tools are needed to couple or uncouple the rods, the task can be accomplished faster and more reliably. The inclusion of the retainer screw as a mechanical lock further increases the reliability of the system.

Thus, the present invention comprises a combination of features and advantages that enable it to overcome various problems of the prior devices. The various characteristics described above, as well as other features, will be readily apparent to those skilled in the art upon reading the following detailed description and referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
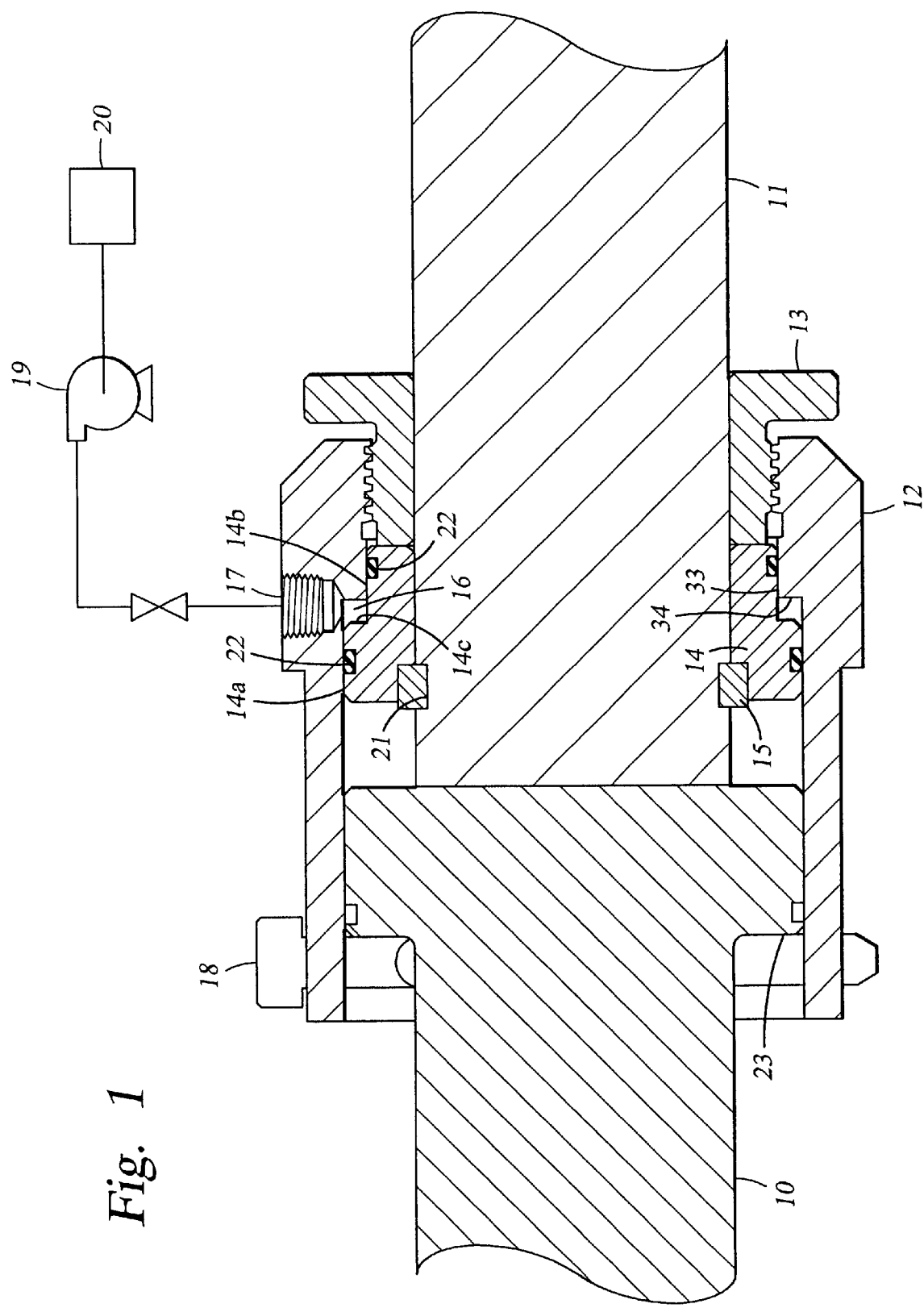
FIG. 1 represents a cross-section of a hydraulic rod connector constructed in accordance with one embodiment of the present invention.

In reference to FIG. 1, a first embodiment of the present piston rod connector includes a first cylindrical rod 11, a second cylindrical rod 10, and a body 12. More specifically, one end of each of first rod 11 and second rod 10 is received in body 12. An annular hydraulic ram 14 is disposed between the outside of rod 11 and the inner wall of body 12. Hydraulic ram 14 includes seals 22 that seal against the inside of body 12. Ram 14 further includes a first diameter portion 14a having an OD approximately equal to the ID of body 12, and a reduced diameter portion 14b. An annular lip 14c is defined between first diameter portion 14a and reduced diameter portion 14b. First rod 11 includes a groove 21 between ram 14 and the end of the rod 11. Groove 21 receives a retaining ring 15. Retaining ring 15 may be a split ring and can be held in place on the rod 11 by any suitable means known to the art including, o-rings, springs, snap rings, and screws.

Body 12 is further adapted to receive an adjustable retaining screw 13 for retaining ram 14 and at least one coupling pin 18 for retaining second rod 10. In one embodiment, second rod 10 includes a shoulder 23 that bears on pin 18. The inner wall of body 12 includes a reduced diameter portion 33 that defines an inner annular shoulder 34. An annular chamber 16 is defined between lip 14c of ram 14 and shoulder 34. A fluid reservoir 20 is provided in fluid communication with chamber 16 via a pump 19 and a pressure inlet 17.

When it is desired to operate the connector of FIG. 1, fluid contained in reservoir 20 is pumped by pump 19 through pressure inlet 17 into chamber 16. Hydraulic pressure inside chamber 16 causes ram 14 to advance relative to body 12 and to bear on split ring 15. This in turn advances first rod 11 toward second rod 10, which is restrained by coupling pin(s) 18. Consequently, a compressive force is created between the first rod 11 and the second rod 10. The compressive force applied between rods 11 and 10 is preferably greater than the maximum tensile load that will be applied to the rods during operation. The size of the ram 14 and operating pressure applied to the pressure chamber 16 are designed to provide the desired amount of force.

A screw 13 preferably threadedly engages the inner wall of body 12 behind ram 14 so that pressure can be released from the pressure chamber 16 without loss of compressive loading between first rod 11 and second rod 10. Screw 13 is preferably removably attached to the body 12 by threads or any other attachment mechanism that is easily released. Because ram 14 is held in its desired position by screw 13, pump 19 and pressure chamber 20 can be removed during normal operation of the pump.

The rods can be uncoupled by re-pressurizing chamber 16 and removing retainer screw 13. Pressure then can be reduced in chamber 16 so as to remove the compressive force between first rod 11 and second rod 10. Once the pressure has been relieved from pressure chamber 16, coupling pins 18 can be removed to allow the removal of the second rod 10. This entire process can be accomplished without the need for heavy wrenches, hammers, or impact tools.

Figure 2:
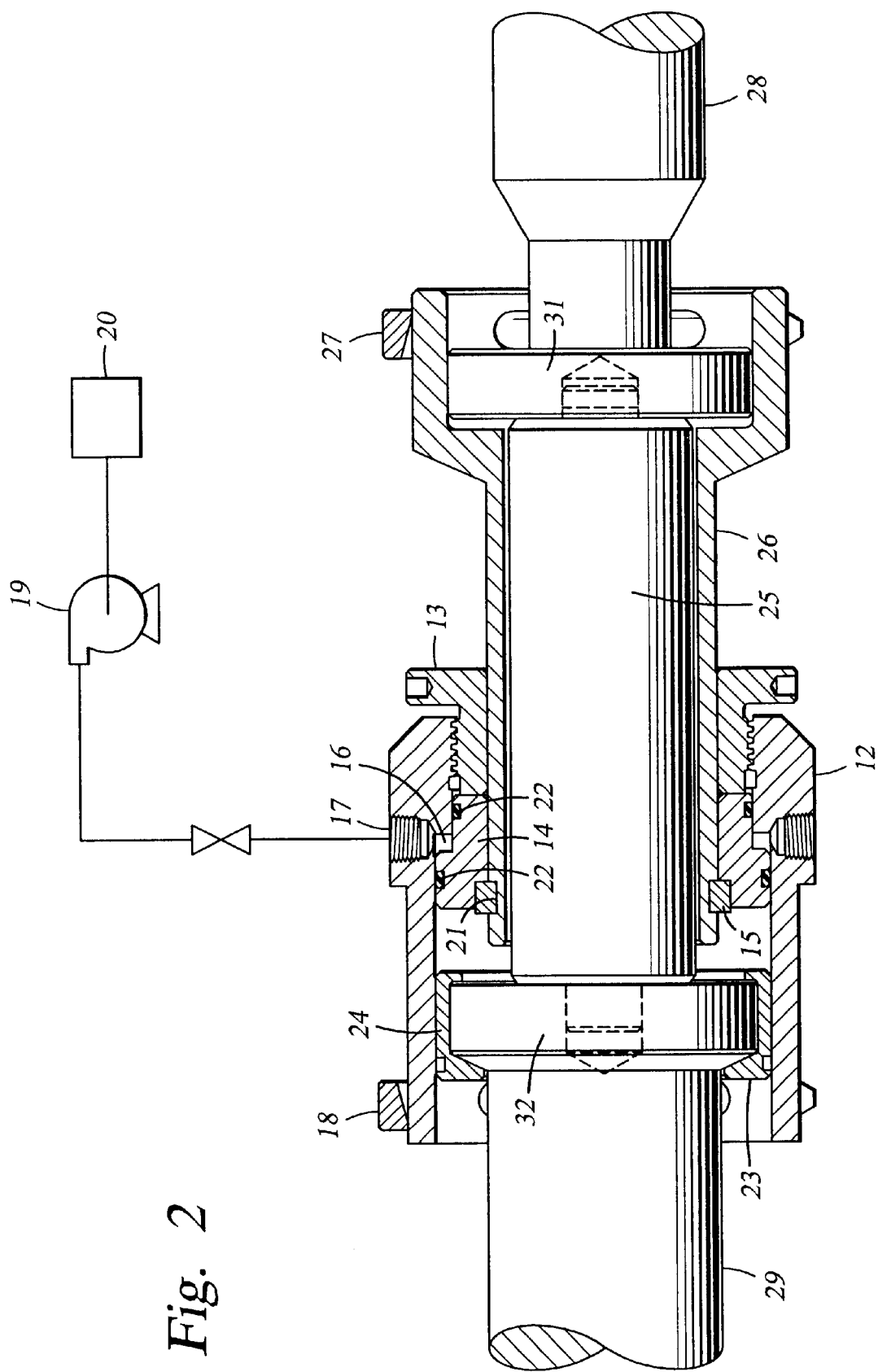
FIG. 2 represents a cross-section of a hydraulic rod connector constructed in accordance with a second embodiment of the preferred invention specially adapted for use on existing mud pump.

In reference to FIG. 2, an alternative embodiment of the present invention is adapted for use with two cylindrical rods 28, 29, flanged ends 31, 32, respectively. The apparatus includes previously disclosed components body 12, retainer screw 13, hydraulic ram 14, retaining ring 15, retainer pin 18, pump 19, hydraulic reservoir 20, and seals 22. Additionally, the embodiment depicted in FIG. 2 comprises a spacer rod 25 and cylindrical sleeve 26 that is adapted to receive retaining pins 27 used to hold flanged rod 28 in place.

Like rod 11 above, cylindrical sleeve 26 has a groove 21 adapted to receive a retaining ring 15. Retaining ring 15 creates a shoulder on which the hydraulic ram 14 bears. This embodiment may also include an adapter 24 with a shoulder 23 to effectively increase the diameter of flange 32 so that coupling pins 18 can properly retain the rod 29. Adapter 24 and the retaining ring 15 are each preferably a two piece arrangement held in place by any number of means known to the art including, o-rings, springs, snap rings, and screws.

This embodiment finds particular application in the retrofit of current design mud pumps, which often require coupling of flanged rods. The flanges 31, 32 are spaced apart by a spacer rod 25 so that there is room for the present coupling device mechanism. The first cylindrical rod 28 is fitted with cylindrical sleeve 26 and coupling pins 27 lock rod 28 in place at flange 31. Similarly, body 12 is adapted to receive coupling pins 18 which retain second cylindrical rod 29 at shoulder 23.

To operate this embodiment, fluid contained in reservoir 20 is pumped by pump 19 through a pressure inlet 17 into a pressure chamber 16. As described above, hydraulic pressure acting inside pressure chamber 16 pushes ram 14 against ring 15. This force advances sleeve 26 relative to body 12 and second rod 29. Consequently, a compressive force is created between first rod 28 and second rod 29 through the spacer 25. The compressive force applied between the rods is considerably greater than the maximum anticipated tensile load applied to the rods during operation. The size of the ram 14 and operating pressure applied to the pressure chamber 16 should be designed accordingly.

Retainer screw 13 preferably threadably engages body 12 such that it prohibits axial movement of hydraulic ram 14, so that pressure can be released from the pressure chamber 16 without loss of compressive loading between the first rod 28 and the second rod 29. Retainer screw 13 may be removably attached to body 12 by threads or any other attachment mechanism that is easily released. Fluid pump 19 and pressure chamber 20 can be removed during normal operation of the pump.

The assembly can be uncoupled by reapplying pressure to the pressure chamber 16 and removing the retainer screw 13. Pressure then can be bled off of pressure chamber 16 to remove the compressive force between first rod 28 and second rod 29. Once the pressure has been relieved from pressure chamber 16, coupling pins 18, 27 can be removed to allow the removal of either rod 28, 29 as required. This entire process can be accomplished without the need for heavy wrenches, hammers, or impact tools.

Although the present invention is described with particular reference to inter-connecting rods used with mud pumps, it will be recognized that the present hydraulic rod connector system may be used or adapted for use in connecting other types of components that benefit from simple coupling and uncoupling. Further, it will be recognized that mud pumps are exemplary of reciprocating or positive displacement pumps and certain features thereof may be used or adapted to be used in other types of reciprocating pumps, such as those used in mining operations.

It is also understood that, although the present invention describes such features as coupling pins and retainer nuts, these particular features are merely illustrative and any easily engaged mechanical connecting mechanism can be utilized to maintain the relative location of the parts. For example, these connections could be bolted connections, a ratchet system, or some other mechanical locking system.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, relative dimensions of various parts, the materials from which the various parts are made, and other parameters can be varied, so long as the hydraulic rod connector system and apparatus retain the advantages and features discussed herein. Accordingly the scope of protection is not limited to the embodiments described herein, but is only limited by the claims that follow, the scope of which shall include all equivalents of the subject matter of the claims.

What is claimed is:

1. An apparatus for coupling two rods rod comprising:
   a first rod having a shoulder;
   a ram positioned so as to bear on said shoulder;
   a body containing said ram and defining a pressure chamber between said body and said ram, said pressure chamber being accessible through a conduit;
   a second rod coupled to said body; and
   a fluid supply that supplies a hydraulic medium through said conduit to said pressure chamber;
   wherein application of fluid pressure to said pressure chamber urges said ram toward said shoulder which in turn urges said first rod toward said second rod.

2. The apparatus of claim 1 wherein the second rod has a flanged shoulder and is coupled to said body by pins engaging said flanged shoulder.

3. The apparatus of claim 1, further including a retainer for maintaining said first rod relative to said body, wherein said retainer is releasably attached to said body by threads.

4. An apparatus for coupling two rods comprising:
   a first rod with a circumferential shoulder;
   a ram located concentric to said first rod and adjacent to said shoulder;
   a body containing said ram and defining a pressure chamber between said body and said ram, said pressure chamber being accessible through a conduit;
   a second rod coupled to said body; and
   a fluid supply that supplies a hydraulic medium through said conduit to said pressure chamber;
   wherein said circumferential shoulder of said first rod is a removable two piece ring that mounts in a circumferential slot on said first rod.

5. An apparatus for coupling a first rod member to a second rod member with a compressive force between the two said rods comprising:
   a first coupling means coupled to the first rod;
   a second coupling means coupled to the second rod;
   a body member connecting said first coupling means and said second coupling means;
   a hydraulic ram adapted to urge said first rod toward said second rod so as to provide the compressive force; and
   a retention means to maintain the compressive force upon release of the hydraulic ram.

6. An apparatus for coupling a first rod member to a second rod member with a compressive force between the two said rods comprising:
   a first coupling means coupled to the first rod;
   a second coupling means coupled to the second rod;
   a body member connecting said first coupling means and said second coupling means;
   exactly one hydraulic ram to provide the compressive force; and
   a retention means to maintain the compressive force.

7. The apparatus of claim 5 wherein said hydraulic ram provides the compressive force through hydraulic pressure.

8. The apparatus of claim 5 wherein the compressive force applied is greater than the maximum expected tension load applied to the rods during use.

* * * * *